US008628289B1

(12) United States Patent
Benedict et al.

(10) Patent No.: US 8,628,289 B1
(45) Date of Patent: Jan. 14, 2014

(54) MATERIAL HANDLING AND STORAGE/WAREHOUSE SYSTEM

(76) Inventors: Charles E. Benedict, Tallahassee, FL (US); Brian G. Pfeifer, Tallahassee, FL (US); Christian A. Yates, Tallahassee, FL (US); Scott K. Bladen, Bristol, FL (US); Richard E. Lackinger, Tallahassee, FL (US); James R. Dobbs, Tallahassee, FL (US)

( * ) Notice: Subject to any disclaimer, the term of this patent is extended or adjusted under 35 U.S.C. 154(b) by 512 days.

(21) Appl. No.: 12/854,990

(22) Filed: Aug. 12, 2010

Related U.S. Application Data

(63) Continuation-in-part of application No. 11/743,585, filed on May 2, 2007, and a continuation-in-part of application No. 11/515,380, filed on Sep. 5, 2006, now Pat. No. 7,931,431, which is a continuation-in-part of application No. 10/429,784, filed on May 6, 2003, now Pat. No. 7,101,139.

(60) Provisional application No. 60/826,868, filed on Sep. 25, 2006.

(51) Int. Cl.
*E04H 6/00* (2006.01)

(52) U.S. Cl.
USPC ............................ 414/234; 414/411; 414/217

(58) Field of Classification Search
USPC ......................................................... 414/234
See application file for complete search history.

(56) References Cited

U.S. PATENT DOCUMENTS

| 3,675,799 | A | * | 7/1972 | Steed et al. | 414/240 |
| 3,730,358 | A | * | 5/1973 | Oji | 211/1.57 |
| 3,756,433 | A | * | 9/1973 | Richins | 414/266 |
| 2005/0220600 | A1 | * | 10/2005 | Baker et al. | 414/626 |

* cited by examiner

*Primary Examiner* — Saul Rodriguez
*Assistant Examiner* — Willie Berry, Jr.

(57) ABSTRACT

A system and method for optimizing the storage capacity of an automated material handling and storage system wherein rows of vertical columns of storage bins are spaced in opposing relationship with one another such that at least one elevator is vertically movable in engagement with the opposing columns of storage bins so that pallets, support platforms or containers may be transferred to or from the elevator to bins of the opposing rows and wherein the elevator may be selectively elevated by overhead carriers that are movable along an intersecting grid track system that is disposed above the storage bins. In one embodiment, the at least one elevator may be independently vertically movable between the opposing column of storage bins.

17 Claims, 12 Drawing Sheets

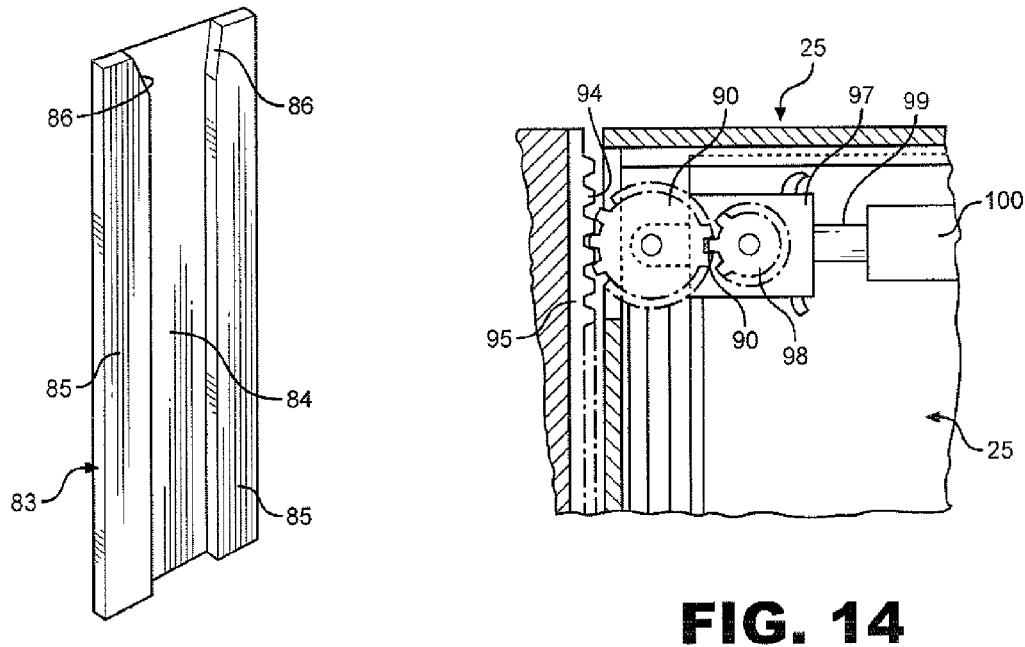
FIG. 12
FIG. 14
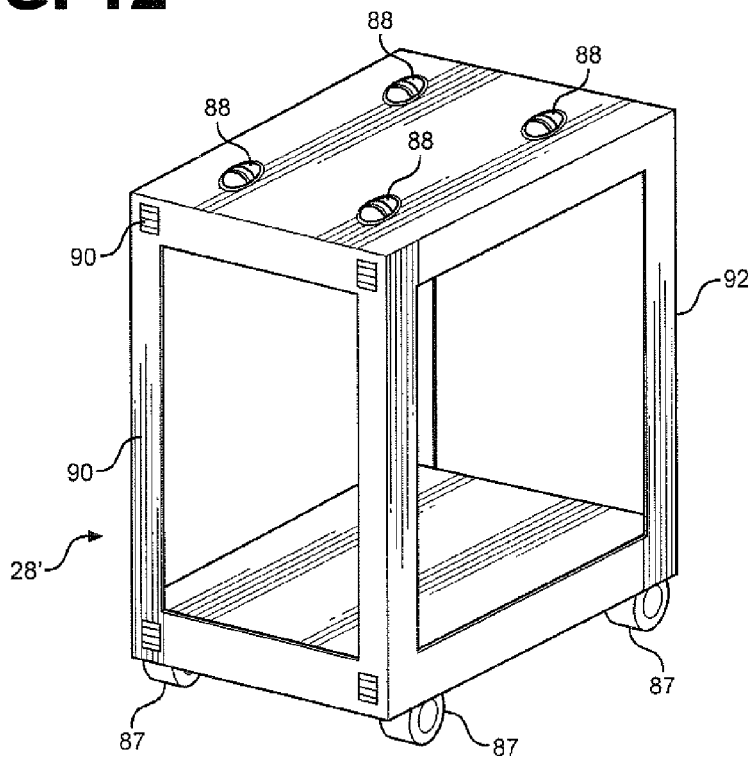
FIG. 13

MATERIAL HANDLING AND STORAGE/WAREHOUSE SYSTEM

CROSS REFERENCE TO RELATED APPLICATIONS

This application is a continuation-in-part of U.S. patent application Ser. No. 11/743,585, filed May 2, 2007, and which application claims priority to U.S. provisional application No. 60/826,868, filed on Sep. 25, 2006, entitled "Warehouse Storage System," both of which are hereby incorporated by reference in their entirety and a continuation-in-part of U.S. patent application Ser. No. 11/515,380, filed Sep. 5, 2006, entitled "Automated Material Handling System With Load Transfer Vehicles," which is a continuation-in-part of U.S. patent application Ser. No. 10/429,784, filed May 6, 2004, now U.S. Pat. No. 7,101,139.

BACKGROUND OF THE INVENTION

1. Field of the Invention

This application is directed to the general field of material handling and storage systems and more particularly to such systems wherein vertical stacks or columns of storage bins are laid out in generally parallel rows that are generally equally spaced by isles that are of generally equal width and of a size to permit one or more movable elevators to be positively guided in vertical movement between two adjacent and facing rows of storage bins. In some embodiments of the invention, the elevators are suspended from overhead carriers that are free to travel relative to any vertical stack of storage bins along an overhead grid track system that is vertically spaced above the storage bins such that when the elevators are raised to adjacent their respective carriers, the carriers and elevators may be maneuvered throughout the grid track system. In other embodiments, the elevators may be independently movable under their own power and have sets of drive sprockets or gears that permit the elevators to ascend and descend the vertical stacks or columns of storage bins by engaging with toothed racks or chain elements that are disposed on opposite sides of each of the vertical stacks or columns of storage bins. In these other embodiments of the invention, the elevators may be selective attached for transport by the overhead carriers or detached for independent travel. In each embodiment, the elevators are provided with self-loading and off-loading pallet transfer mechanisms that are operative to either pull pallets from a storage bin or move pallets into a storage bin.

2. Brief Description of the Related Art

A need for storage space is often an issue for many people, governments and businesses. Whether it be people living in small urban units, such as apartments and condominiums, people downsizing to smaller homes, such as for retirement, businesses generating stacks of papers and files, or the need to warehouse goods for retail, wholesale businesses, or future use, storage solutions are in demand.

Conventional storage facilities typically include a plurality of individual storage units, such as garages, rooms, stacked shelves, bins or lockers, that are housed within a static structure, such as a building or warehouse. In order to use many such facilities, customers, businesses and government agencies must transport items to be stored to and from loading or docking areas where items are transferred to the storage rooms, shelves or bins. Conventional large or bulk items are placed on pallets that are moved to and from storage areas by way of hand trucks, cranes, forklifts or other vehicles. Thus, storage facilities have a lot of "dead space" that is taken up by aisles that must be sufficiently wide to permit maneuvering of transport vehicles.

In an attempt to mitigate against some of the problems associated with conventional offsite storage facilities, other forms of storage have been developed, including storage containers that are delivered to a location designated by a customer. The customer then loads the items to be stored in such containers, and the containers are picked up and stored in an offsite facility. While this type of storage system eliminates the hassles associated with transporting items to be stored to a storage facility, these systems still suffer from "dead space" problem and therefore do not maximize storage space. After a storage container is loaded, picked up from the customer's location, and delivered to an offsite facility, heavy equipment such as, fork lifts, cranes, vehicles, and the like are used to move the containers into storage areas. The use of this heavy equipment requires a large amount of "dead space," such as wide aisles, to enable the storage containers to be maneuvered into storage spaces.

In addition, with the ever increasing costs of real estate, there is a need to optimize the storage capacity of any facility that is to be used for the long or short term housing or storage of goods.

SUMMARY OF THE INVENTION

The present invention is directed to a fully automated multi-directional material handling and storage or warehousing system that provides pallet carrying elevators that are movable both vertically and horizontally throughout an array of generally parallel rows of vertical stacks or columns of storage bins such that any elevator may be accessible to each of the storage bins of the system. The rows of storage bins are spaced apart a distance substantially equal to a width of the elevators so that guide elements or drive mechanisms mounted on the elevators cooperatively engage either guide tracks or teeth/chain elements mounted on opposite sides of each vertical stack or column of storage bins.

In one embodiment, the elevators are suspended from carriers that are movably mounted so as to travel along an X-Y grid track system that is mounted in vertically spaced relationship above the rows of storage bins with the elevators being raised and lowered relative to the carriers by cables that are controlled by two or more winches mounted on each carrier. Each carrier further includes a plurality of carriages that support the carrier on intersecting tracks that form the grid track system. Each elevator includes at least two spaced guide elements, such as rollers or wheels, that extend outwardly from opposite sides thereof which are engageable within generally U-shaped guide tracks that extend vertically on opposite sides of openings into each of the storage bins of a column of bins so that the elevators are positively guided relative to the storage bins when being raised or lowered relative to the overhead carrier. In preferred embodiments, at least two guide elements are mounted on each side of each elevator.

In another embodiment, the elevators may be independently vertically and/or horizontally movable relative to the storage bins after being released from an overhead carrier. In these embodiments, vertical gear racks or chains including spaced teeth are mounted to extend along opposite sides of each of the storage bins in a column. Each elevator is provided with oppositely oriented drive gears or sprockets that are engageable with the teeth or chains of the vertical racks. Drive motors carried by each elevator are controlled to rotate each of the gears or sprockets at uniform velocities and in opposite directions on opposite sides of each elevator. In this embodiment, as an elevator ascends to the top of the vertical racks between two rows of vertically stacked storage bins, the elevator will automatically engage by guide arms that depend from the overhead carrier, such that when the elevator is raised and locked to the overhead carrier, it is free of the vertical racks. The carrier with the elevator suspended therefrom is freely movable above the array of storage bins.

In preferred embodiments of the invention, the overhead grid track system includes at least one section that extends outwardly of the storage bins, such as over a loading dock or the like so that pallets carrying articles to be shipped or placed into storage may be transferred to or from other vehicles.

To facilitate the transfer of pallets or containers to and from each of the elevators, rollers or other devices having a low frictional resistance may be provided within each storage bin or may be secured to the bottom of the article carrying pallets or containers. Further, each elevator will include loading and off-loading pallet or container transfer mechanisms that are selectively engaged to a pallet to lock the pallet on an elevator as the pallet is being moved within the storage system, and which are operable to push or pull a pallet from or into or off of the elevator into an aligned bin or onto another support surface. After a pallet or container is moved from an elevator, the load transfer mechanisms are released from the pallet or container and retracted relative to the elevator.

In some embodiments of the invention, power to the loading and off-loading transfer mechanisms and the motors for the drive gears or sprockets is provided by on board batteries or an umbilical power line from the overhead carrier. In the embodiments where the elevators are being vertically raised and lowered by winches on the overhead carriers, the loading and off-loading mechanism may be electrically powered from one or more power cables extending from the overhead carriers. The carriers may be powered by on board batteries or by providing an induction or other electrical power grid in association with the grid track system.

One of the advantages of the storage system of the invention is that storage space in maximized within any storage facility due to the fact that the amount of aisle space required is only limited to the width of the elevator required to hold and transfer various sizes of the pallets or containers. This is because the elevators are specifically designed to engage facing vertical stacks or columns of storage bins, and unlike conventional forklifts and the like, no additional space is required between the opposing storage bins to provide for the turning and maneuvering of a load elevating vehicle.

To further maximize storage space, the vertical guide racks or tracks are preferably inset relative to the outer face of the storage bins such that the guide rollers, wheels, slides or drive gears or sprockets extending from the opposite sides of the elevators are seated therein such that the side walls of the elevators are closely spaced relative to the outer faces of the storage bins.

It is an object of the invention to allow multiple carriers and elevators to operate simultaneously within a storage system by allowing the elevators to be moved along the grid track system above the bins in any X-Y direction toward and away from a load transfer dock or station.

It is another object of the present invention to provide a warehouse or other material handling and storage system that maximizes storage space by reducing the size of aisles, hallways, and other areas of non-storage space by using a plurality of vertical columns of storage bins having depths substantially equal to the width of the aisles and wherein pallets or containers to be stored in the bins are manipulated by one or more elevators that are transferred throughout the system using overhead transfer units or carriers.

It is a further object of the invention to provide elevators that may be self-powered when being maneuvered vertically relative to columns of storage bins and wherein such elevators include drive gears or sprockets and the like for engaging pairs of oppositely facing toothed racks or chain-like elements that are provided on opposite sides of each column of storage bins and wherein the elevators may be selectively attached to overhead transfer units or carriers that lift the elevators and maneuver them throughout the grid tracks of the storage system.

It is yet another object of the invention to provide a storage system wherein pallets loaded with goods that are stored in columns of storage bins or that are to be placed within such bins for storage are automatically loaded and off-loaded relative to vertically movable elevators by transfer devices carried by the elevators.

BRIEF DESCRIPTION OF THE DRAWINGS

A better understanding of the invention will be had with reference to the accompanying drawings wherein:

FIG. 12 is a partial view of a section of guide track provided on opposite sides of the columns of storage bins of FIGS. 9-11;

FIG. 13 is a perspective view of another embodiment of elevator in accordance with the invention wherein the elevator is raised and lowered under its own power by on-board drive sprockets that engage with teeth of racks provided on the front portions and on opposite sides of the vertical columns of storage bins;

FIG. 14 is a partial cross sectional view showing one of the drive sprockets of FIG. 13 being deployed;

DESCRIPTION OF THE PREFERRED EMBODIMENT

Figure 6:
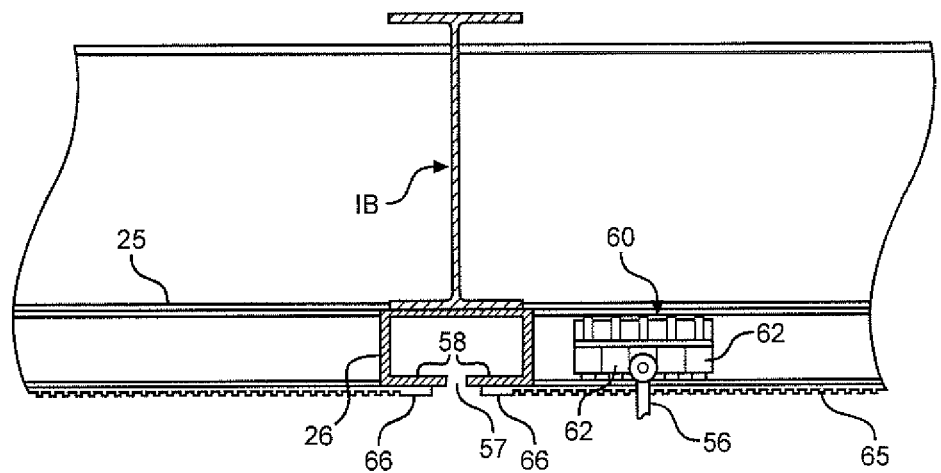
FIG. 6 is a cross sectional view through two intersecting rails or tracks of the grid track system showing a side view of a support carriage used to suspend a carrier from one of the tracks.
Figure 7:
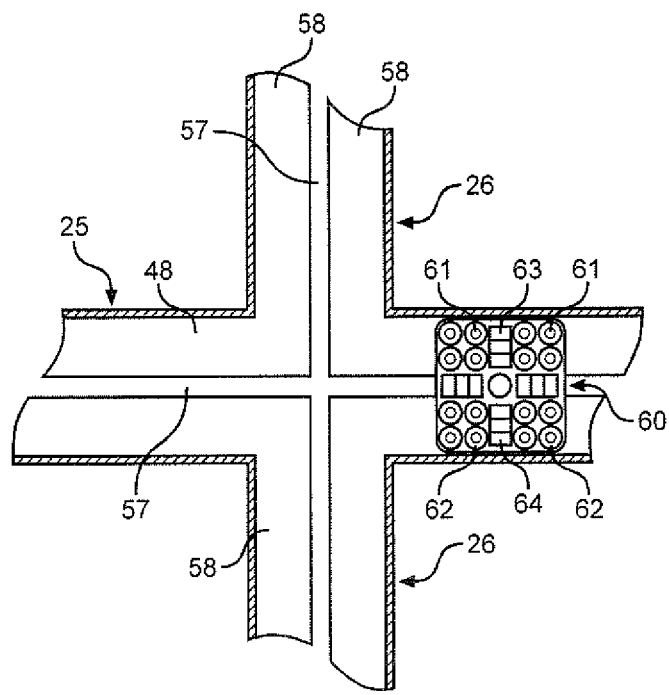
FIG. 7 is a bottom view of the carriage shown in FIG. 6.

With continued reference to the drawings, an article handling and storage system 20 is disclosed that includes an overhead grid track system 22 that is disposed above a storage area that includes a plurality of rows 23 of vertical columns of back-to-back storage bins 24. The grid track system includes intersecting generally perpendicularly oriented tracks 25 and 26 wherein each of the tracks 25 are parallel with one another and each of the tracks 26 are parallel with one another. In one embodiment of the invention, each track is formed of a steel box beam having a generally C-shaped cross section oriented downwardly toward the storage bins. In this embodiment and as shown in FIGS. 6 and 7, each track defines a pair of support flanges that are spaced by an open slot for purposes that will be described in greater detail hereinafter. The tracks are welded or otherwise secured to supports such as "I" beams (IB) and form intersecting X-Y sections. When the tracks are formed with the C-shaped cross sections, the open slots communicate with one another at the intersection of the tracks. In other embodiments of the invention, other rail or track structures may be used to support overhead carriers.

To optimize the storage capacity of the area in which the system 20 is to be used, the aisles "I" between the rows of storage bins is created having the same width "W" as the depth "D" of each of the storage bins. Unlike conventional warehouse and storage systems that require space for maneuvering vehicles between the rows of storage bins, with the present invention, pallets "P" carrying goods to be shipped or stored are maneuvered using elevators 28 that are raised and lowered between opposing columns of storage bins while being engaged with the bins. The elevators are designed to be transported and moved relative to the bins by overhead carriers 30 that are mounted to the tracks or rails of the grid track system.

Figure 1:
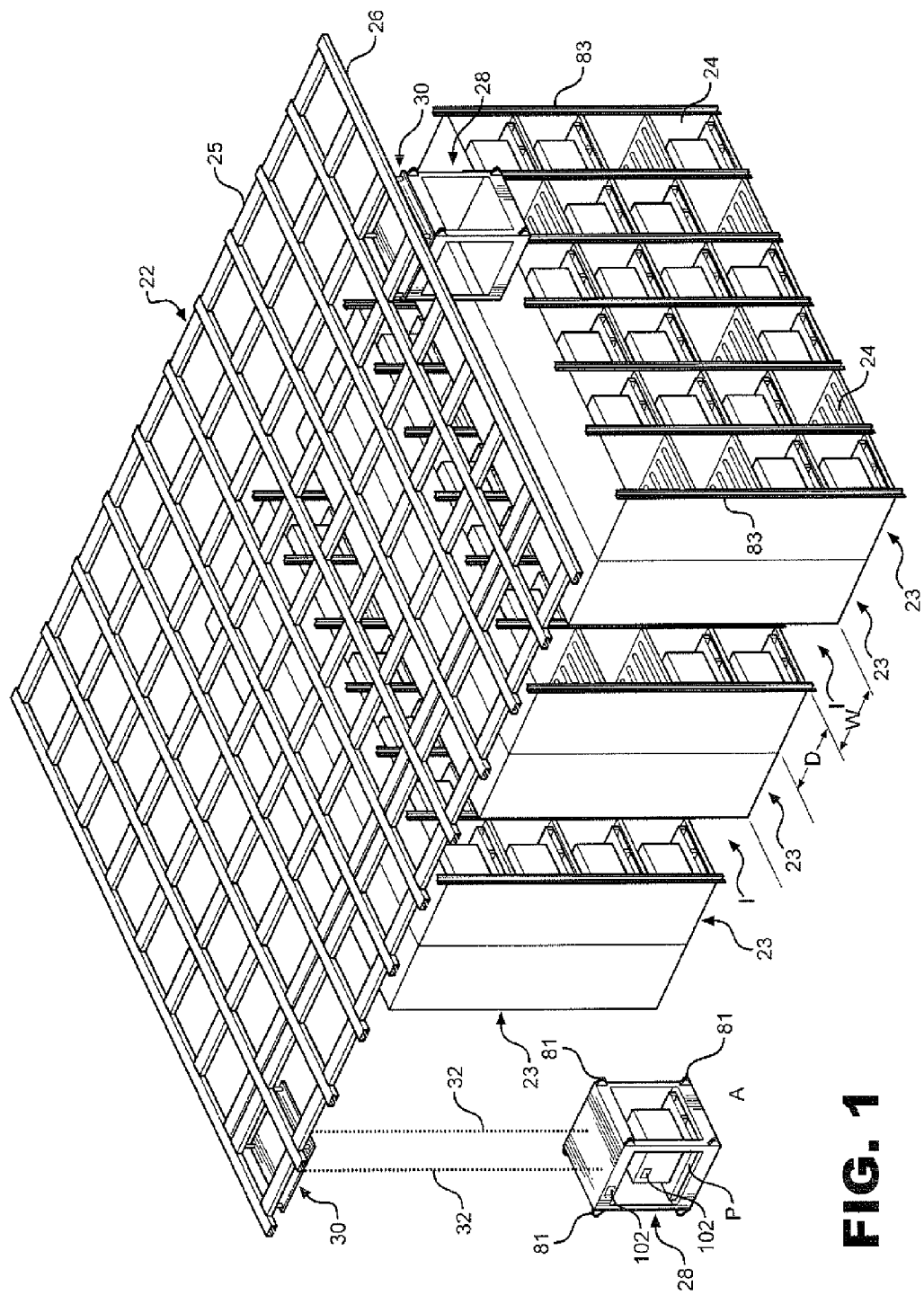
FIG. 1 is a perspective illustrational view of a material handling and storage system in accordance with a first embodiment of the invention showing an overhead grid track system extending over a plurality of rows of vertical columns of storage bins with two carriers being shown that are movable along the track system and from which are suspended pallet transferring elevators.
Figure 2:
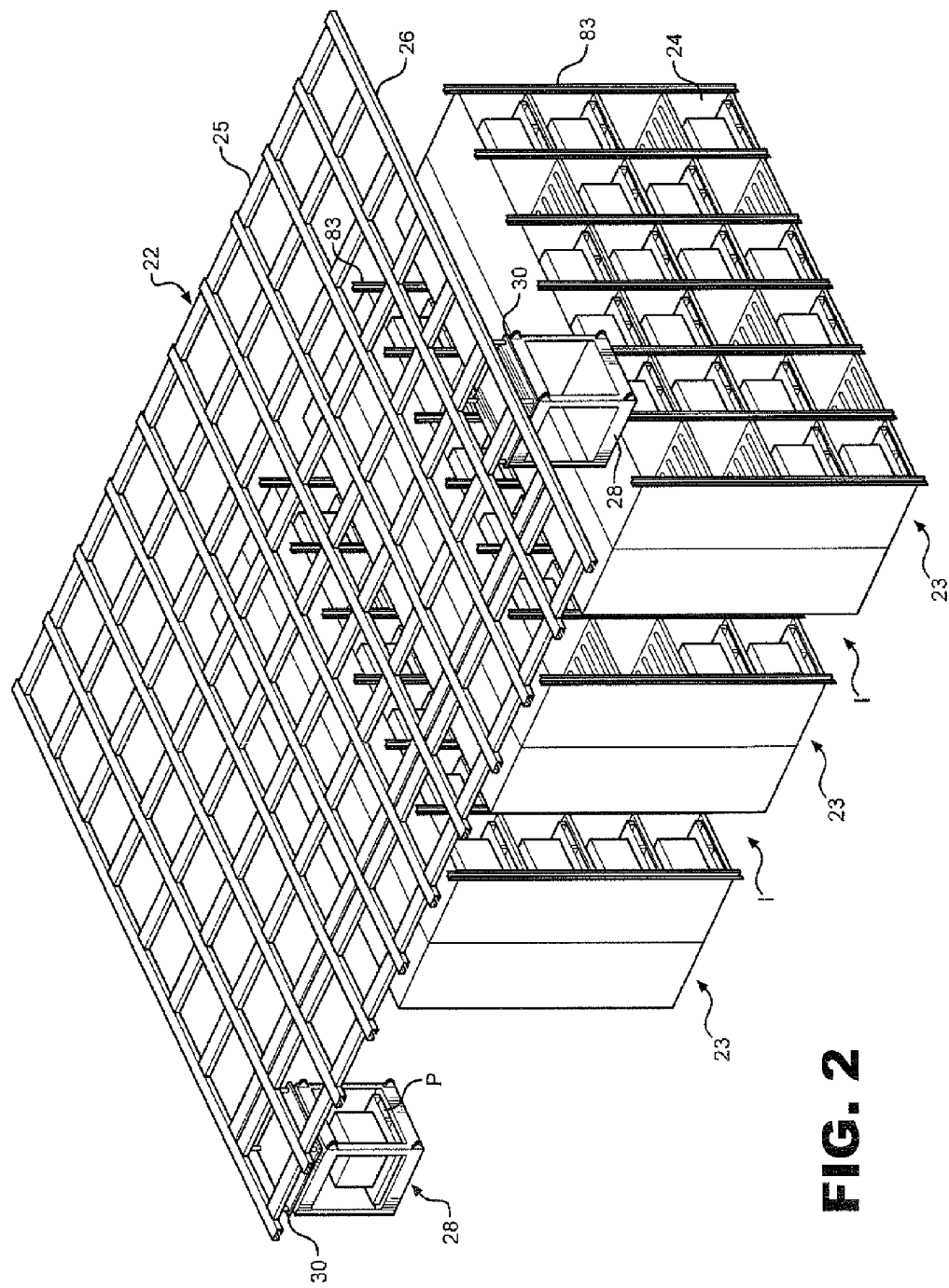
FIG. 2 is a perspective illustrational view similar to FIG. 1 but showing both elevators raised to transport positions beneath and secured to the carriers.
Figure 3:
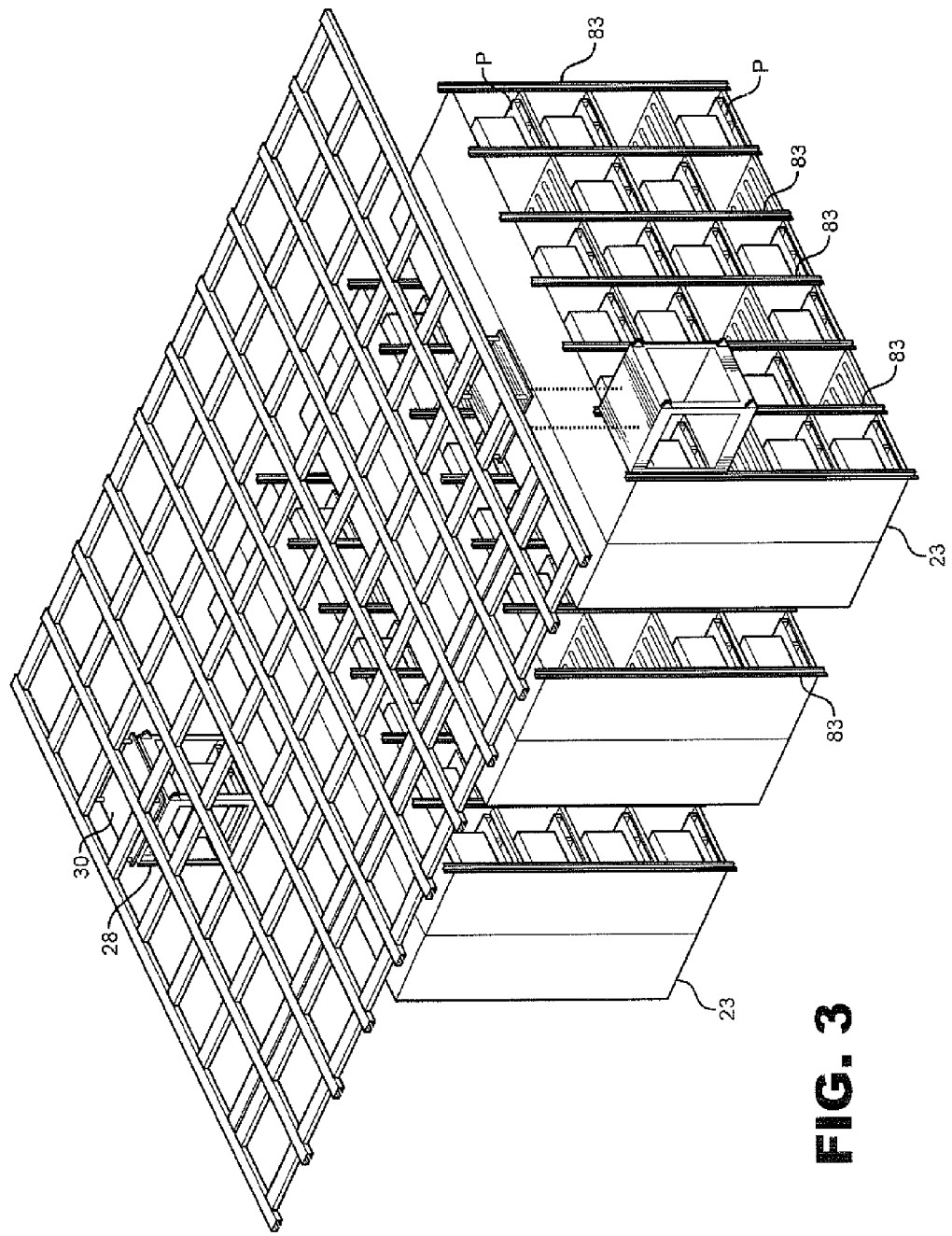
FIG. 3 is a perspective illustrational view similar to FIGS. 1 and 2 showing one of the elevators being lowered into alignment with one of the storage bins.

In FIGS. 1-3, only two elevators 28 are shown, each suspended by cables 32 from their respective carriers 30. It should be noted that the drawings show two cables for suspending each elevator from a carrier, in preferred embodiments of the invention, four cables will be used and positioned adjacent each of the corners of the elevator. It should be noted that any number of elevators and carriers may be used within the system. Due to the intersecting rails of the track system, numerous carriers may operate simultaneously without interfering with one another. As further shown in FIGS. 1-3, the grid track system 22 is spaced above the storage bins a distance sufficient to allow the elevators to pass above the storage bins when the elevators are raised into contact with their respective carriers. In preferred embodiments, locking mechanisms, not shown, mounted on the carriers will retain the elevators in their raised positions. The tracks of the grid track system are aligned relative to the storage bins such that as the carriers move about the system, the elevators will be positioned so as to be lowered between the opposing columns of storage bins. Further, as shown in FIG. 1, at least a portion of the grid track system extends outward beyond the area of the storage bins, such as over a docking or receiving/shipping area "A" so as to permit pallets "P" to be loaded or off-loaded relative to the elevators.

Figure 4:
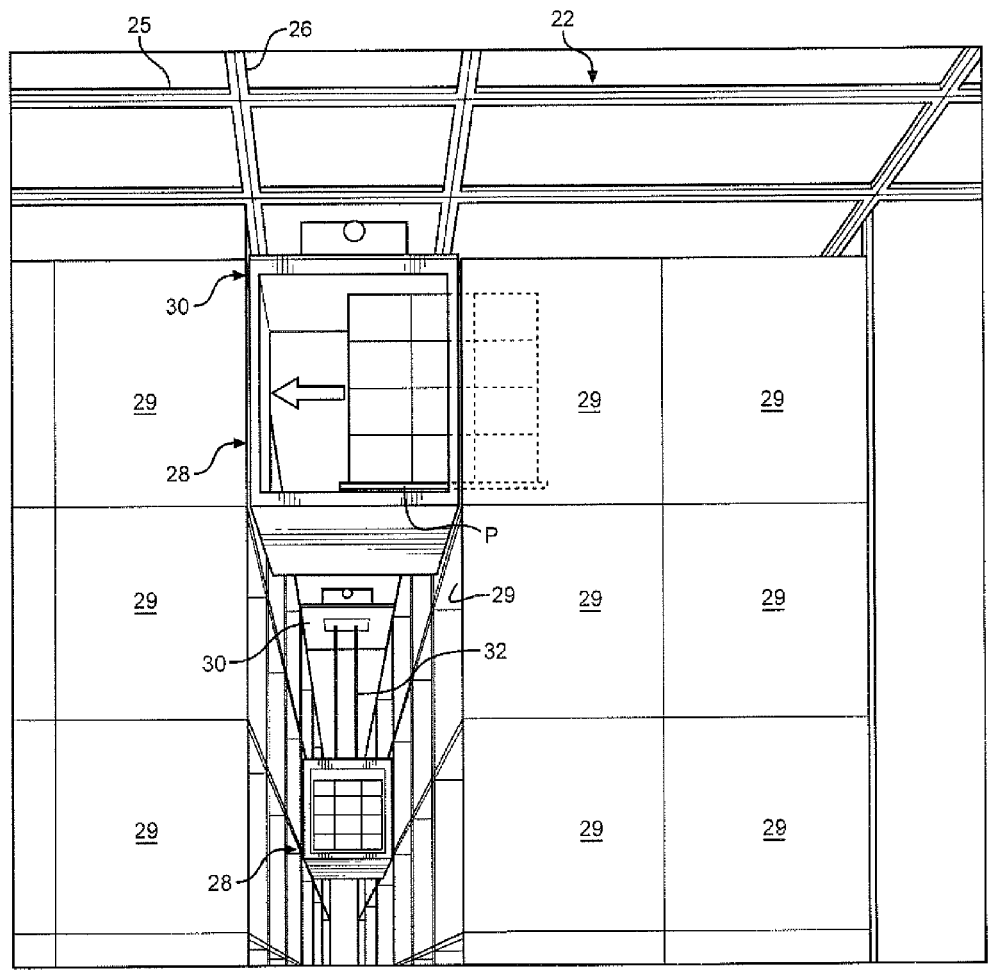
FIG. 4 is a perspective view of a modified storage bin system looking down an aisle between opposing vertical columns of storage bins illustrating one elevator being loaded with a pallet from a storage bin with another loaded elevator being suspended from a carrier.

With reference to FIG. 4, a modified arrangement of the columns of storage bins 24 to the overhead grid track system is shown wherein the elevators are not moved above the columns but are raised and lowered between the columns by hoists carried by the overhead carrier. In this embodiment, there is insufficient space above the storage bins to permit passage of the elevators so the elevators are moved laterally along the aisles "I" between opposing rows of storage bins until the elevators enter into side aisles that extend perpendicularly to the aisles "I" at the end of the rows. Thereafter, the elevators are moved by the carriers 30 to a different aisle "I". In FIG. 4, one elevator 28 is shown as receiving a pallet to be moved from a storage bin 24 with a second elevator already loaded in the background.

Figure 5:
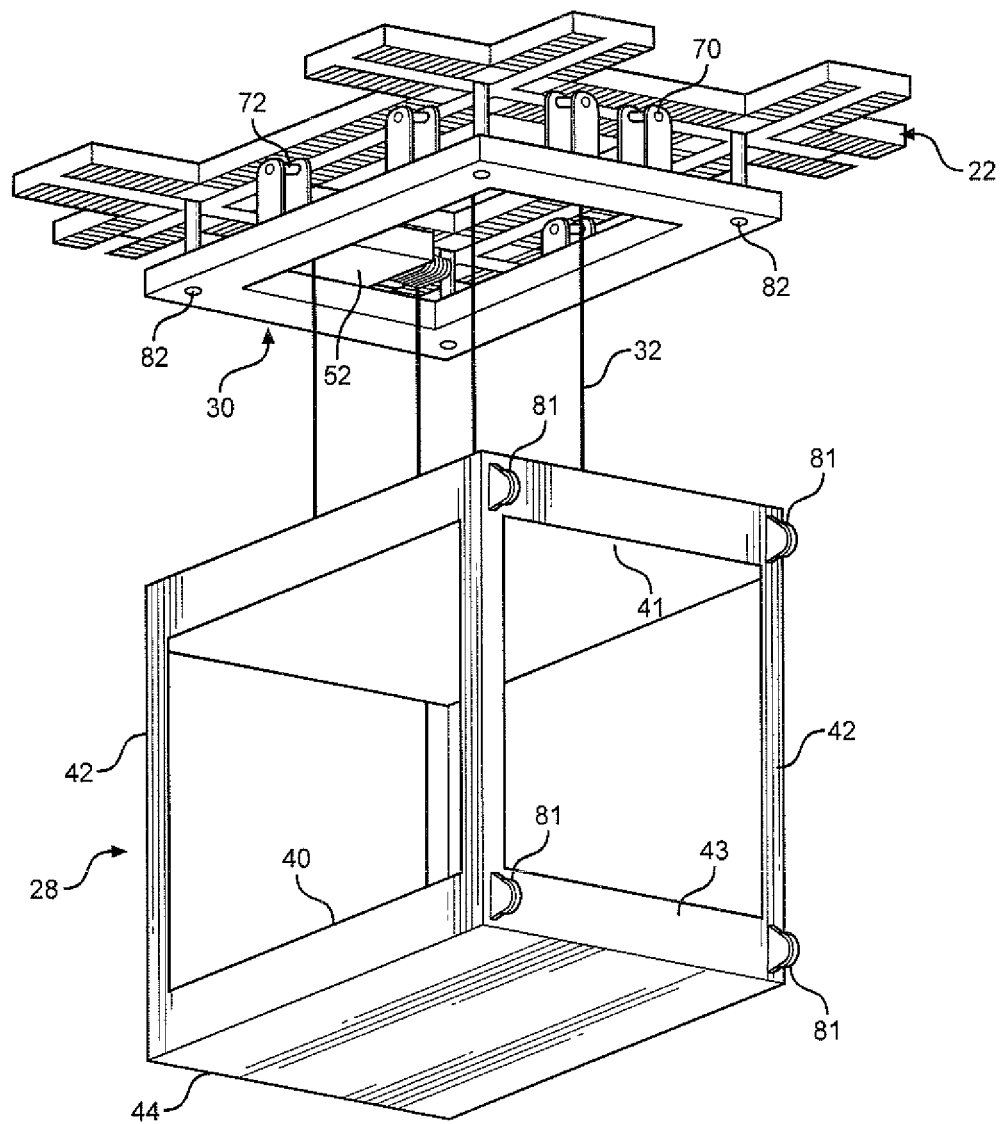
FIG. 5 is a partial view showing an elevator suspended from a carrier by cables and showing drive gears for moving the carrier relative to the grid track system.
Figure 9:
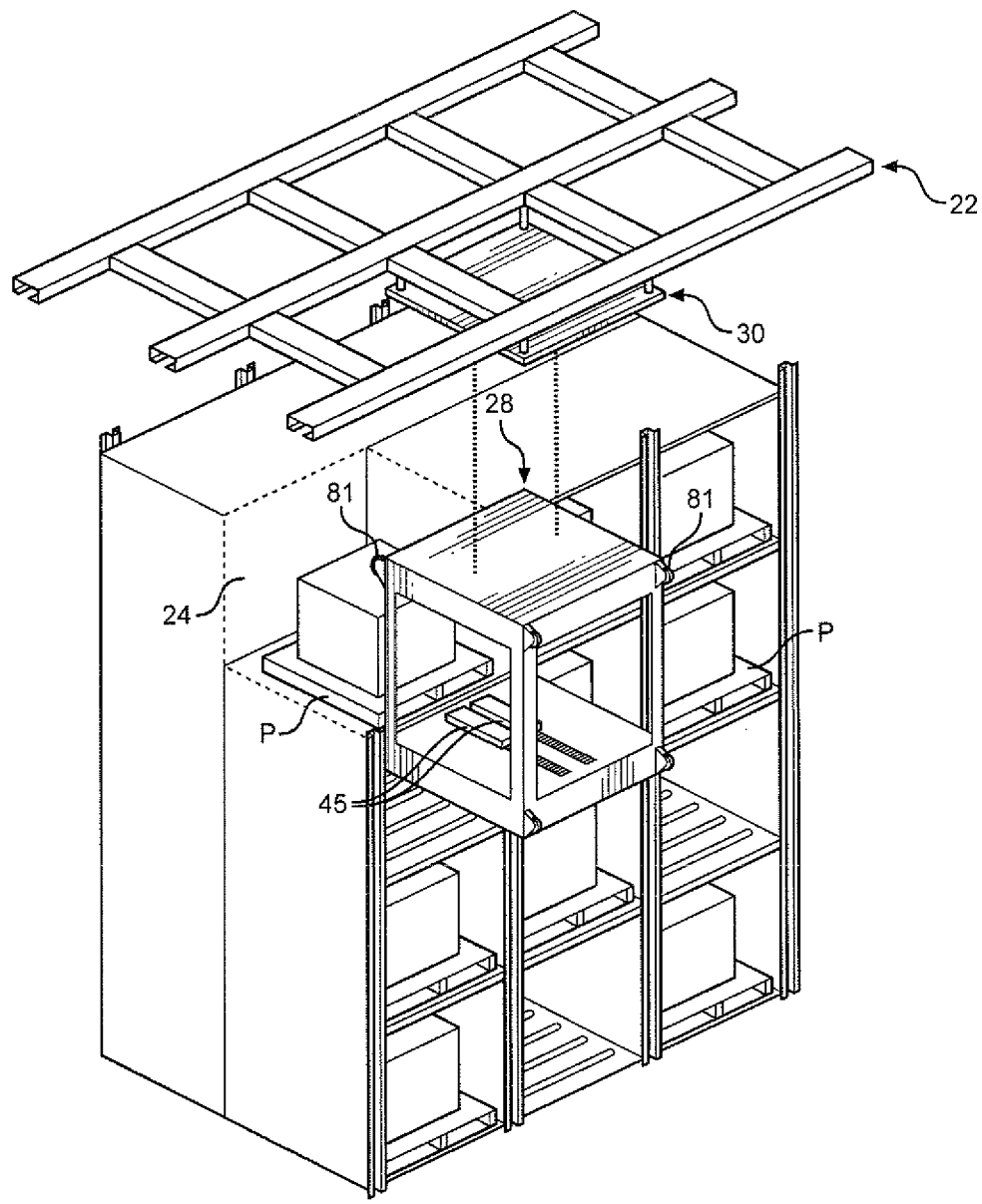
FIG. 9 is a perspective illustrational view of an elevator being lowered to alignment with one of the storage bins of the invention.
Figure 10:
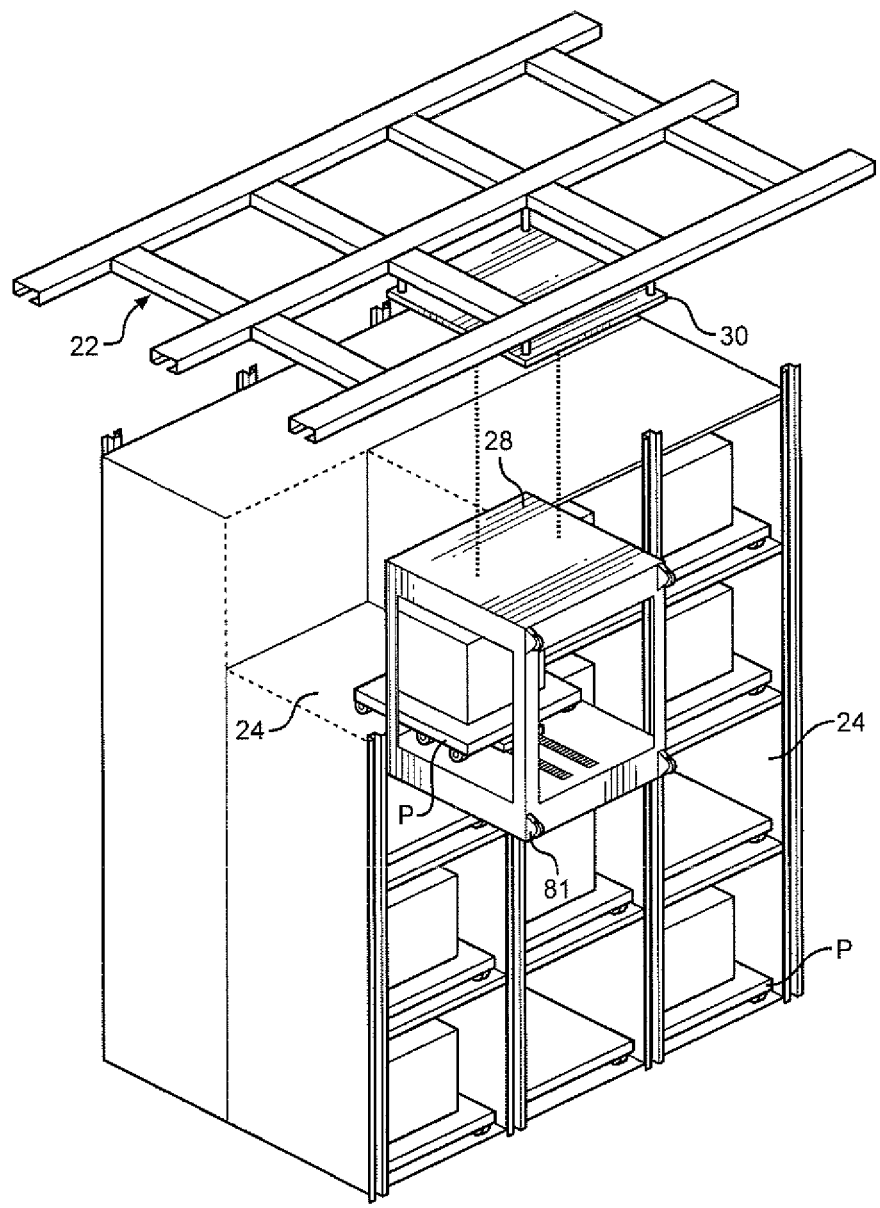
FIG. 10 is a view similar to FIG. 9 showing a pallet being engaged to begin loading onto the elevator.
Figure 11:
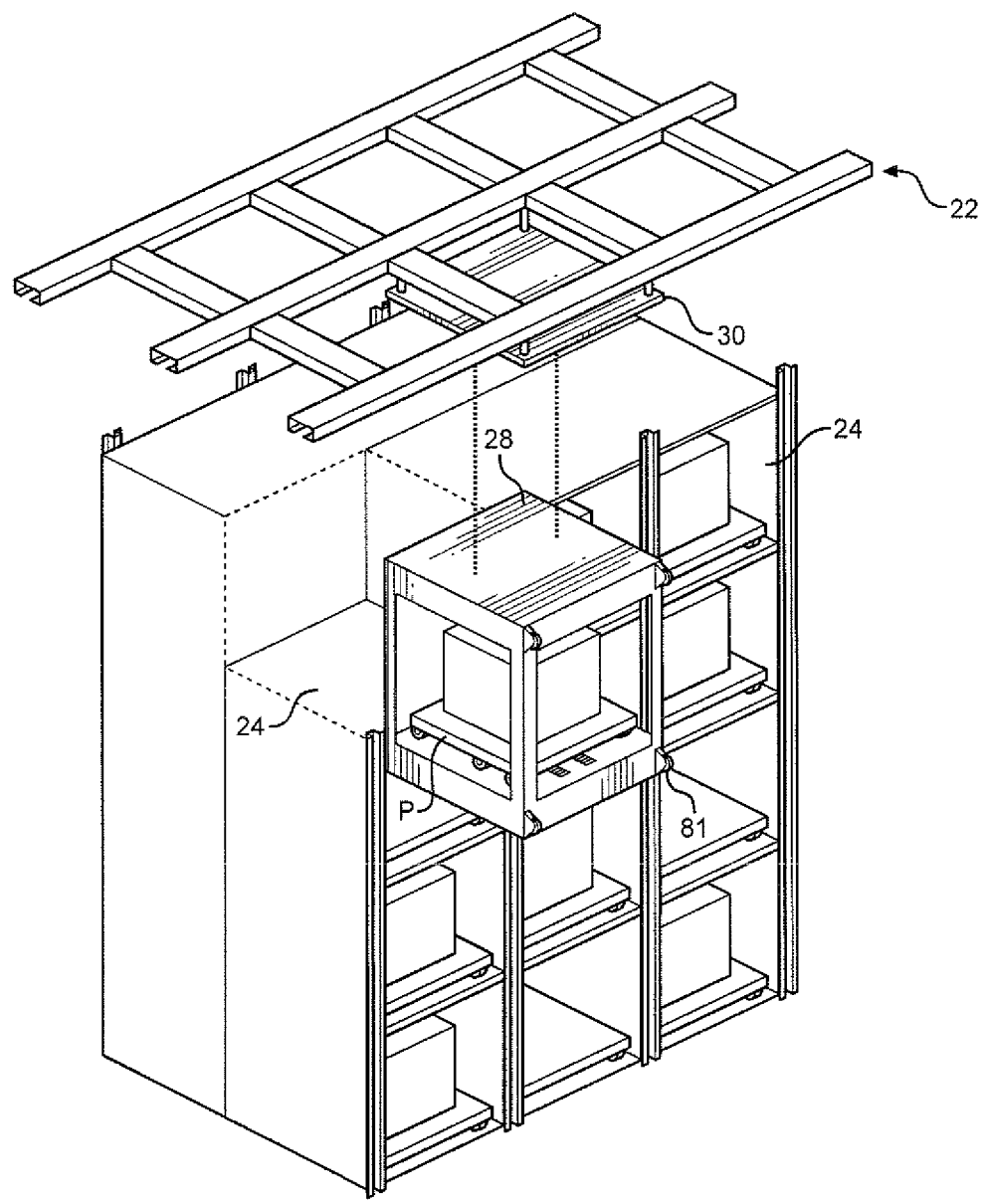
FIG. 11 is a view similar to FIG. 10 showing the pallet loaded onto the elevator.

With reference to FIG. 5, each elevator 28 includes a floor 40 and ceiling structure 41 that are connected, such as by corner posts 42. The opposite sides 43 and 44 of the elevator are preferably open so that as an elevator is lowered between opposing vertical columns of storage bins, pallets may be selective loaded or off-loaded from either side thereof. Further, and as shown in FIG. 9, movement of the pallets "P" relative to the elevators is controlled by transfer mechanisms 45 and 46 mounted to the elevators. Transfer mechanisms 45 are used to extend and retrieve pallets from one side of the elevators to the bins while transfer mechanism 46 is used to extend and retrieve pallets from the opposite side of the elevators. The transfer mechanisms will be described in greater detail hereinafter.

Figure 8:
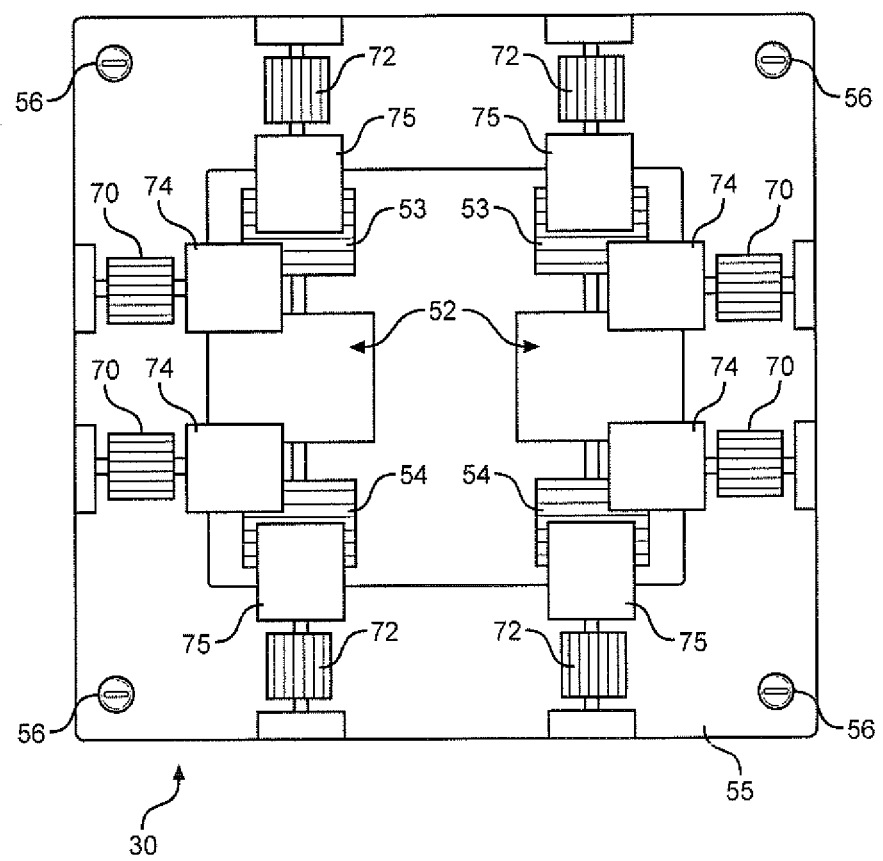
FIG. 8 is a top plan view of the carrier of FIG. 5 showing the drive pinions and the winches of the carriers of the invention.

With continued reference to FIGS. 5 and 8, the elevators are raised and lowered by the cables 32 that are controlled by a pair of electric winches 52 carried by the carriers. In preferred embodiments, each winch has two winding spools 53 and 54 about which the cables are wound. The carriers may include solid platforms or open rectangular steel frame structures 55, as is shown in the drawings.

With reference to FIGS. 6-8, each carrier is supported at each of the four corners thereof by support or pilot hanger shafts 56 that extend upwardly from the frame and through open slots 57 that are provided in the overhead track system 22. As previously described, the track system is formed by a plurality of hollow steel box beams 25 and 26 that are welded or otherwise secured to the steel girders or roofing "I" beams (TB) of a structure so that the open slots 57 are oriented downwardly. Load bearing flanges 58 are formed on opposite sides of the slots on which roller carriages 60 are movably supported. Each of the pilot hanger shafts 56 is centrally secured to a separate roller carriage.

The box beams 25 and 26 that form the track system 22 include both longitudinally extending sections and transverse sections that are oriented at generally right angles with respect to one another. The roller carriages include lower heavy duty roller ball sets 61 and 62, respectively, that support the carriages within the box beams. Each carriage also includes two pair of wheel sets 63 and 64.

The lower surfaces of each of the track 25 and 26 may be provided with gear racks 65 and 66, respectively, with which drive pinion gears 72 of drive assemblies carried by the carriers 30 are in meshed engagement. With specific reference to FIG. 8, each carrier includes eight drive pinion gears, two on each side of the frame 55 that are engaged with the gear racks. In an alternative embodiment not shown, the carriers can be provided with rubber drive wheels instead of the gear racks and drive pinions.

With reference to FIG. 8, drive motors 74 and 75 are attached to each of the drive pinion gears 72. The drive motors 74 are controlled by a master encoder 76M on one of the drive motors 74 that controls slave encoders 76S on the other motors 74 such that all the drive motors 74 operate in synchronization with one another. Another master encoder 77M is provided on one of the motors 75 which is operative to control the other motors 75 which have slave encoders 77S associated therewith so that all motors 75 are operable in synchronization with one another. In this manner, the drive motors 74 are controlled by master encoder 76M to move the carrier 30 longitudinally from the front of the grid track structure to a back thereof and vice versa. Likewise, the master encoder 77M controls the drive motors 72 to move the carrier transversely from one side of the grid track structure to the opposite side and vice versa.

Each carrier 30 is designed to raise and lower an elevator 28. To accomplish this, the hoist motors 52 are activated by a remote or on-board controller. The outputs from these motors are connected to the pairs of winding drums 53 and 54. The cables 32 depend from the drums to lower ends that are fixed to the elevator 28. As the elevator is raised toward a carrier by activation of the motors 52, locking pins, not shown, that extend upwardly from the four corners of the top of the elevator will be aligned with, and subsequently received in, guide openings 82 provided in the lower four corners of the carrier in order to stabilize the elevator relative to the carrier as the carrier moves about the grid track system 22. Locks may be provided in the openings 82 to secure the elevator in fixed relationship to the carrier.

One of the features of the present invention is that the elevators are guided in engagement with the storage bins that are in opposing relationship with one another on opposite sides of each aisle. In a first embodiment, each elevator includes at least two spaced guide members that are movable along vertically oriented u-shaped guide tracks 83 that are provided along the front face and on opposite sides of each column of storage bins and that define guide slots or channels 84. As shown in FIG. 12, each slot is defined between a pair of spaced vertically extending flanges 85. In preferred embodiments, the guide members are wheels 81 that are retained within the vertical slots or channels 84 with four wheels shown extending outward from each of the opposing sides of the elevator. To reinforce the guide slots 84 and to further save space between the opposing storage bins, the slots are inset relative to the front face of the bins, as is shown in the drawings. In some embodiments the vertical guide tracks may be mounted to the exterior face of the storage bins. Further, although four wheels 81 are shown extending from each side of the elevator, one or more wheels may be used to guide the elevator relative to each vertical guide slot. To assist in the alignment of an elevator when being lowered from a carrier into engagement with the vertical guide slots, the upper ends of the slots may be flared outwardly as shown at 86 so that, in the event the elevator is not properly aligned with storage bins, the elevator will be shifted into proper alignment. In this embodiment, the elevators are fully controlled in their vertical movement by the hoists carried by the overhead carriers.

Figure 15:
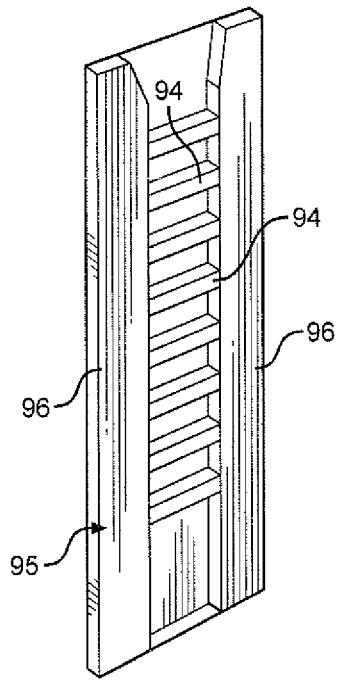
FIG. 15 is a partial view of a section of toothed rack provided on opposite sides of each vertical column of storage bins for use with the elevators shown in FIG. 13.

In another embodiment of the invention, and as shown in FIG. 13, the elevators 28' are designed to move vertically between opposing columns of the storage bins under their own power. The elevators 28' are provided with at least two drive sprockets 90 that are extendable outwardly from the opposite sides 91 and 92 of the elevators. In the embodiment shown, four drive sprockets extend outwardly from each of the opposite sides of the elevator, with only one side being fully shown in FIG. 13. In FIG. 13 the drive sprockets are shown withdrawn into the framework of the elevator adjacent each of the four corners thereof. With reference to FIG. 14, one of the drive sprockets 90 is shown as being deployed outwardly of the framework of the elevator so as to mesh with gear rack teeth or chain slots 94 of vertically extending guide racks 95 that are provided on opposite sides of each of the vertical columns of storage bins. As shown in FIG. 15, each of the vertical guide racks 95 includes the plurality of equally spaced gear rack teeth chain slots 94 that are disposed between reinforcing flanges 96. The guide racks may be use in place of the guide members 83 or, in some instances, the gear rack teeth or chain slots 94 may be recessed relative to the flanges 96 such that guide slots are formed in front of the teeth or chain elements such that the racks or chains may be used for guiding both embodiments of elevators of the invention. As with the guide tracks 83, the upper end of the racks may be beveled outwardly to facilitate alignment of the elevators with the gear racks or chains.

As further shown in FIG. 14, each drive pinion or sprocket 90 is driven in rotation by an electric, pneumatic or hydraulic motor 97 that drives a drive gear 98 that meshes with the drive pinion or sprocket. On-board controllers are used to synchronize the operation of all the motors 97 so that the drive pinions or sprockets function together to raise and lower the elevator 28' relative to the storage bins. As further shown in FIG. 14, the drive pinion or sprocket and its drive motor is reciprocally carried on a ram 99 of a piston member 100 so that they may be selectively deployed outwardly of the framework of the elevator 28' into engagement with the guide racks.

Figure 16:
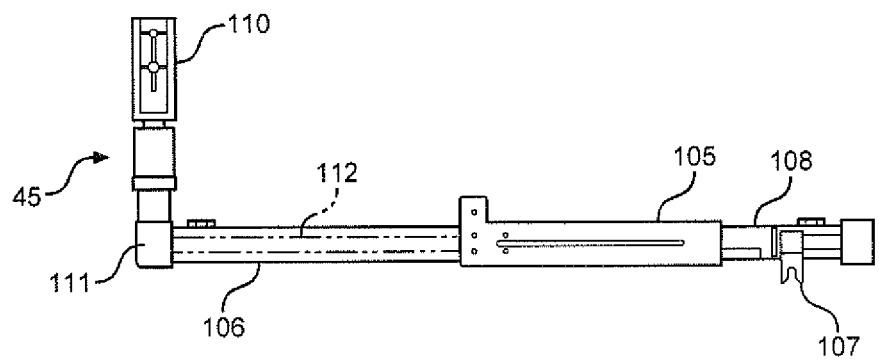
FIG. 16 is a top plan view of a pallet transfer device that is used with the elevators of the invention to move pallets to and from the elevators.

With specific reference to FIG. 16, one example of pallet transfer mechanism 45/46 is shown. Each transfer mechanism includes a reciprocally movable load engagement arm 105 that is mounted within a guide channel 106 that is secured to the base of the elevator. A somewhat U-shaped catch 107 is pivotally mounted at the free end of the arm 105 that is used to selective engage a bracket (not shown) mounted beneath each pallet, platform or container. Each catch is mounted on an electronic swivel unit 108 that when activated, pivots the catch from a normal upright position 900 to a low profile horizontal position, as shown in the drawings.

When a pallet, platform or container is to be loaded onto an elevator, the catch is rotated to the low profile position as the arm 105 is extended toward a pallet, platform or container within a storage bin 24. When the arm is fully extended, the catch is allowed to return to its upright position wherein the catch will engage the bracket of the pallet, platform or container. Thereafter, the arm 105 is retracted into the elevator pulling the pallet, platform or container onto the elevator. The catch remains in engagement with the bracket of the pallet to thereby stabilize the pallet within the elevator. Movement of the arm 105 is controlled by a reversible motor 110 that has a drive output connected through a gear box 111 to a lead screw 112 within the channel 106. A pallet, platform or container is removed from an elevator into a storage bin in a reverse manner.

In each of the embodiments of the invention, the warehouse storage system may include means for identifying each storage bin, carrier and/or elevator. Such identification means may include a radio frequency identification tag or a bar code indicia 102 (see FIG. 1). Using on board sensors, the movement of the carriers and the elevators may be easily and remotely controlled. Accordingly, the sensors are able to obtain data from the identification tags or indicia regarding the position of each elevator and carrier in the storage system. The sensors may also transfer information to remote computers for analysis and inventory control.

For security purposes, each of the storage bins may include a lock or blocking mechanism that either engages with a pallet, platform or container within a bin or which obstructs movement of a pallet, platform or container from a bin unless a load transfer mechanism of an elevator is extended into the bin to retrieve a pallet, platform or container therefrom. In this manner, pallets, platforms and containers may only be discharged from a bin when an elevator is aligned with a bin and stopped from further vertical motion such that the elevator is stabilized to facilitate loading and unloading of the pallet, platform or container relative to the bin.

The foregoing description of the present invention has been presented to illustrate the principles of the invention and not to limit the invention to the particular embodiments illustrated. It is intended that the scope of the invention be defined by all of the embodiments encompassed within the following claims and their equivalents.

We claim:

1. A material handling and storage system for selectively storing items carried on movable supports, comprising:
    a plurality of columns of vertically spaced storage bins that are aligned in opposing rows and which are spaced by generally equally spaced aisles;
    a pair of vertically oriented guide tracks extending on opposite sides of each column of vertically spaced storage bins so as to be aligned with opposing vertically oriented guide tracks on opposite sides of an opposing column of vertically spaced storage bins;
    at least one elevator being of a size to movably carry one of the supports with items thereon along an aisle between opposing rows of storage bins, the at least one elevator having opposite sides from which guide elements extend so as to be selectively engaged with two pairs of opposing vertically oriented guide tracks when the at least one elevator is positioned between two opposing columns of vertically spaced storage bins;
    a stationary overhead grid track system including a first section spaced above the rows of columns of vertically spaced storage bins and at least one second section adjacent said first section and vertically spaced storage bins, the overhead grid track system including pairs of spaced and parallel tracks that extend within said first and second sections and which intersect with one another at generally right angles;
    at least one powered carrier mounted to the overhead grid track system so as to be movable transversely in an X-Y plane along the first and second sections, said at least one carrier including hoist means for selectively raising and lowering the at least one elevator between the opposing pairs of columns of storage bins; and
    transfer means carried by the at least one elevator for selectively transferring a movable support from either side of the at least one elevator into or from aligned storage bins.

2. The material handling and storage system of claim 1, wherein a depth of the storage bins in a row of storage bins, from front to rear thereof, is substantially equal to a width of an aisle between opposing rows of storage bins.

3. The material handling and storage system of claim 1 wherein each of the vertical guide tracks is formed as a recessed open slot between a pair of spaced side walls.

4. The material handling and storage system of claim 3 wherein upper ends the spaced side walls are flared outwardly so that the slot there between is flared outwardly to facilitate an alignment of the guide elements within the slots of the vertical guide tracks.

5. The material handling and storage system of claim 4 wherein the guide elements are rotatable.

6. The material handling and storage system of claim 5 including at least two guide elements extending from each side of the at least one elevator for engaging each vertical guide track.

7. The material handling and storage system of claim 1 including at least two guide elements extending from each side of the at least one elevator for engaging each vertical guide track.

8. The material handling and storage system 1 wherein each of the vertical guide tracks is formed as a rack have generally equally spaced teeth and the guide elements of the at least one elevator are rotatable drive elements having teeth that cooperative mesh with the teeth of the racks.

9. The material handling and storage system of claim 8 including means mounted within the at least one elevator for selectively deploying the rotatable drive elements from the sides thereof to engagement with the racks and for selectively withdrawing the rotatable drive elements from engagement with the racks.

10. The material handling and storage system of claim 9 wherein four rotatable drive elements are selectively movable relative to each side of the at least one elevator.

11. The material handling and storage system of claim 10 wherein the at least one elevator includes means for moving the elevator along a horizontal support surface.

12. The material handling and storage system of claim 11 including means for selectively attaching the at least one elevator to cables extending from the hoist means of the at least one carrier.

13. The material handling and storage system of claim 1 including roller elements provided within the storage bins elements for supporting the supports placed therein.

14. The material handling and storage system of claim 1 including controlling means for automatically electronically controlling the movement of the at least one elevator and the at least one carrier, the controlling means including electronic means for identifying a storage bin and activating means for activating the at least one transfer unit to appropriately store or retrieve one of the supports relative to a predetermined storage bin.

15. A method for storing items carried on movable supports in storage bins that are oriented in spaced rows of columns of vertically spaced and opposing bins, wherein vertical guide tracks are provided on opposite sides of the storage bins of each column and wherein at least one elevator is provided that is engageable with opposing pairs of vertical guide tracks, and wherein a stationary overhead grid track system is provide spaced above the columns of storage bins along which at least one carrier is movable in and X-Y motion, the method including the steps of:
    A. Loading a movable support on the at least one elevator and elevating the at least one elevator beneath the at least one carrier;
    B. Moving the at least one carrier transversely along the overhead grid track system so as to be over opposing columns of storage bins and thereafter lowering the at least one elevator such that the elevator engages with pairs of opposing vertical guide tracks;
    C. Lowering the at least one elevator to be aligned between opposing storage bins and thereafter discharging the movable support into one of the two opposing storage bins; and
    D. Thereafter raising the at least one elevator to beneath the at least one carrier such that the elevator disengages the pairs of opposing vertical guide tracks, and maneuvering the at least one carrier along the overhead grid track system.

16. The method of claim 15 including the additional step of:
- E. Moving the at least one carrier so as to be above a predetermined opposing rows of storage bins;
- F. Lowering the at least one elevator into engagement with pairs of opposing vertical guide tracks of another opposing column of storage bins and thereafter lowering the at least one elevator into alignment with a predetermined pair of opposing storage bins;
- F. Retrieving a movable support from within one of the opposing predetermined pair of storage bins and thereafter raising the at least one elevator to beneath the at least one carrier; and
- G. Moving the at least one carrier and the at least one elevator along the overhead grid track system.

17. The method of claim 15 including a step of releasing the at least one elevator from the at least one carrier and moving the at least one elevator between opposing columns of storage bins r by drive means carried by the at least one elevator that are engaged with the opposing pairs of vertical guide tracks.

* * * * *